United States Patent [19]
Vandament

[11] 4,051,833
[45] Oct. 4, 1977

[54] REINFORCED STRUCTURAL PANEL WITH INTEGRAL SOLAR ENERGY COLLECTING ARRAY AND METHOD OF PRODUCING AND ASSEMBLING SAME

[76] Inventor: Daniel D. Vandament, 527 Fairview Ave., Mill Valley, Calif. 94941

[21] Appl. No.: 633,380

[22] Filed: Nov. 19, 1975

[51] Int. Cl.² .............................................. F24J 3/02
[52] U.S. Cl. .................... 126/270; 52/222; 52/615; 126/271
[58] Field of Search ............... 126/270, 271; 237/1 A; 52/222, 615

[56] References Cited
U.S. PATENT DOCUMENTS

| | | | |
|---|---|---|---|
| 2,089,865 | 8/1937 | Voss | 52/222 |
| 3,563,305 | 2/1971 | Hay | 126/270 |
| 3,872,636 | 3/1975 | Nicosia | 52/615 |
| 3,887,410 | 6/1975 | Lindner | 52/615 |
| 3,893,506 | 8/1975 | Laing | 126/271 |
| 3,937,208 | 2/1976 | Katz | 126/271 |

Primary Examiner—Kenneth W. Sprague
Attorney, Agent, or Firm—Fitch, Even, Tabin & Luedeka

[57] ABSTRACT

A composite reinforced structural panel includes upper and lower skin members with a flexible arched member arranged therebetween and secured in place by means of an adhesive, insulating material such as structural grade polyurethane foam, the ends of the flexible arched member being fixed to the lower skin member. Preferably, a solar energy collecting array is disposed upon each structural panel with means for interconnecting the solar arrays on adjacent panels. In a method of producing the panel, the upper and lower skin members and the flexible arched member are arranged in the manner described above whereupon the foam is injected therebetween to maintain the flexible member in its arched configuration. In a method of forming a surface upon a structure having spaced vertical supports at each end with a plurality of such panels, the panels are arranged so that the load bearing ends of the arched member in each panel span the distance between the support means, the joints between the adjacent panels being sealed and fitted to provide a continuous surface.

17 Claims, 9 Drawing Figures

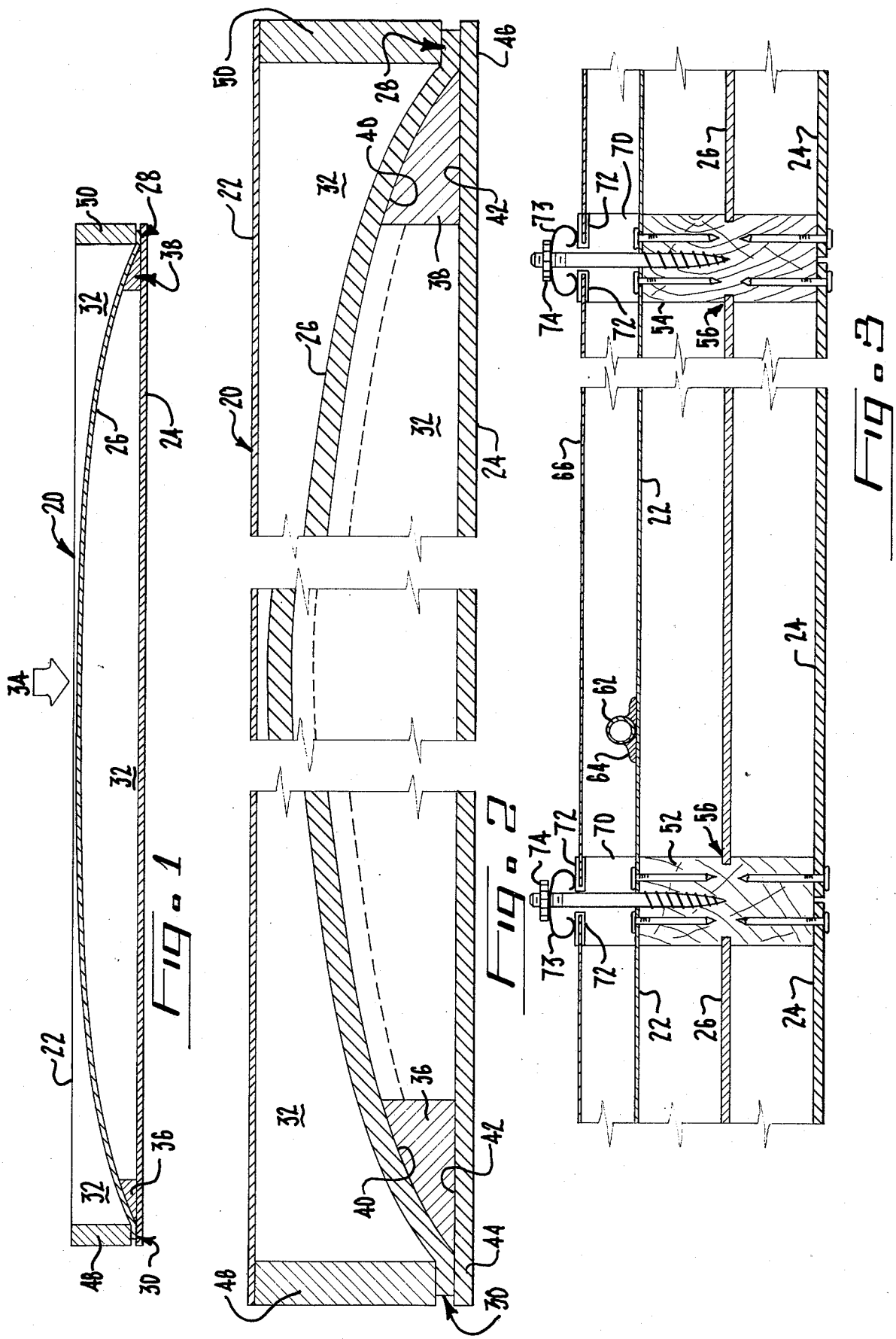

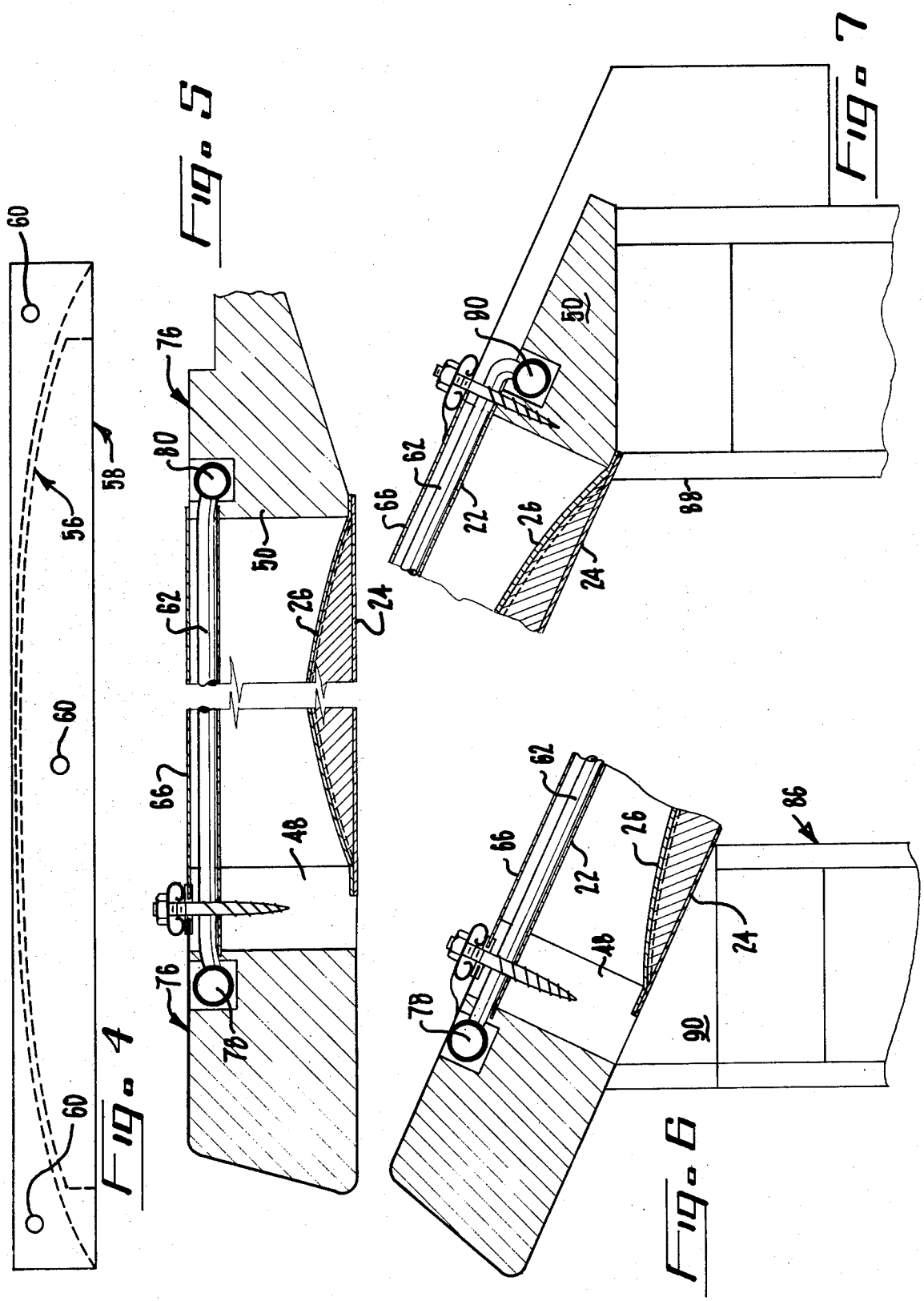

REINFORCED STRUCTURAL PANEL WITH INTEGRAL SOLAR ENERGY COLLECTING ARRAY AND METHOD OF PRODUCING AND ASSEMBLING SAME

BACKGROUND OF THE INVENTION

The present invention relates to a reinforced and well insulated, integral structural panel and more particularly to such a panel wherein structural strength is provided by an internal arch member. The invention is also directed toward such a structural panel including a solar energy collecting array with means for interconnecting the arrays on adjacent panels. In addition, the invention is directed toward a method of forming such a surface portion of a building or other structure from a plurality of such panels as well as a method of forming the structural panels themselves.

The use of structural panels for forming surfaces, such as roofs and walls upon various structures is well known in the prior art. It is well known to form such structural panels with other skin members, the space between the skin members being filled with an adhesive insulating material such as polyurethane foam.

Use of foam material in this instance is of particular advantage since it provides good dimensional stability and structural strength while being light weight and of good insulating quality, partly because of its low density and porous structure. Such foam materials have predictable structural and adhesive qualities and particularly lend themselves to the addition of flame retardant materials so that both the panels and the structure upon which they are arranged tend to resist flame propagation and spread. The foam insulating material also contributes inherent accoustical dampening properties.

It is also well known in the prior art to provide solar energy collecting arrays suitable for disposition upon a surface such as a roof or wall of a building or other structure. The present invention contemplates the use of such a solar energy collecting array wherein water or other liquids or fluids are circulated through pipes or channels which are exposed to the sun's rays. The heated liquid may be used directly, for example, as a hot-water supply or indirectly by circulating the heated liquid to a heat transfer unit adapted for heating or cooling within the building itself or for other installations. Such solar energy collecting arrays may also be employed either upon the roofs of homes or adjacent structures to supply heating for swimming pools or the like. The solar energy collecting arrays may of course also be used in other buildings or structures.

It is important to realize in connection with the present invention that economy of construction and assembly is of critical importance both for structural panels of the type discussed herein as well as for solar energy collecting arrays either along or in combination with the structural panels. Further, econony is important at all stages of construction and operation. Initially, it is important that the construction and method of assembly for the structural panels be accomplished with minimum cost in order to minimize the unit cost for the structural panels either alone or in combination with a solar energy collecting array.

Subsequently, labor may be a substantial cost factor in the mounting of a plurality of the panels, again either alone or with a solar energy collecting array, in structures such as a home or other buildings. It is therefore also important that assembly of the plurality of panels to form an integral part of the structure, such as a roof and/or ceiling for example, be accomplished at minimum cost.

SUMMARY OF THE INVENTION

Accordingly, it is one object of the present invention to provide a composite reinforced structural panel and optional solar energy collecting array suitable for assembly of the panels to form a continuous, insulated structural surface such as a roof.

It is also an object of the present invention to provide a reinforced structural panel of a type including a flexible, arched member which is maintained in its arched configuration by an adhesive, insulating structural material, a plurality of the panels being capable of rapid assembly into a continuous surface for a structure by means of a joint arrangement between adjacent panels. The adhesive insulating material must exhibit sufficient strength to resist flexure of the arched member and develop structural strength for the panels.

Because of the strength developed within the panels to resist side loading they may also be used to form walls or even load bearing floors of building or other structures as well as roofs.

It is also an object of the invention to provide a method of forming such panels wherein upper and lower skin members are arranged in spaced apart relation with the flexible arched member disposed therebetween, adhesive, insulating material then being injected into intimate contact with both sufaces of the flexible arched member and the inner surface of the upper and lower skin members to provide dimensional stability for the entire panel and to maintain the flexible arched member in its arched configuration and thereby develop structural strength.

It is a further object of the invention to provide such a method of forming structural panels wherein an interconnecting means such as a block or key is formed as a portion of each panel, along one side thereof, and provides a means for interconnecting two adjacent panels during their assembly to provide a continuous surface.

It is also an object of the present invention to provide a particularly simple and inexpensive method for forming a continuous structural surface from such panels through the employment of structural panels including a flexible arched member of the type discussed immediately above together with a joint means for interconnecting adjacent panels and sealing the joints therebetween. Through such a combination, the structural panels may provide the entire structural surface such as a roof for a building. In addition, one skin member for the panels such as the lower skin may have a finished surface to also provide a finished interior surface for the structure. This object of the invention may also be accomplished for a composite reinforced structural panel toegether with a solar energy collecting array wherein a plurality of the panels may form both the exterior structural surface as well as a finished interior surface, if desired.

Another major advantage in the design of the present panel is its adaptability for combination with various types of solar energy collecting panels or arrays. For example, any suitable metal (aluminum, copper, steel, etc) may be used for the array. The panel is particularly contemplated in standard structural sizes, 4 × 8 feet, 4 × 12 feet, 4 × 16 feet, etc and collector arrays having such dimensions are readily usable. For example, Reynolds Aluminum Co. produces such a standard solar panel system, under the trademark ATOREX 14, using a thin gauge metal or plywwod sheet for the top skin member with finned aluminum or other metal tubes attached to the surface. Such a system could easily be employed in combination with the present panel. The adaptability of the panel for using solar collector systems of different materials is particularly important since different metals and alloys have individual chemical and physical properties which may be best employed in different solar system applications. For example, if light weight is particularly important, aluminum might be considered. If high operating temperatures are most impostant, copper or silver might be most feasible. Cost and service longevity together might favor the use of steel.

Additional objects and advantages of the invention are made apparent in the following description having reference to the accompanying drawings.

DESCRIPTION OF THE DRAWINGS

FIG. 1 is a sectioned view of a longitudinal edge of a structural panel according to the present invention.

FIG. 2 is a substantially enlarged view similar to FIG. 1 while more clearly illustrating internal details of construction for the structural panel. FIG. 3 is a similar elongated view in section of a plurality of the structural panels arranged together, this view being taken perpendicularly to the views of FIGS. 1 and 2 to illustrate the joint and sealing arrangement between adjacent panels, the structural panel of FIG. 3 also including a solar energy collecting array.

FIG. 4 is a fragmentary view of a removable insert employed during the injection of foam into the panel.

FIG. 5 is another elongated view in section of a single panel as illustrated in FIG. 3 to particularly illustrate interconnecting means for solar energy collecting arrays upon adjacent structural panels combined to form a continuous structural surface.

FIGS. 6 and 7 are further enlarged views similar to opposite end portions of FIG. 5 to clearly illustrate the manner in which the end portions of the structural panel may be mounted upon support means such as walls or joist assemblies of a building.

DESCRIPTION OF THE PREFERRED EMBODIMENTS

The reinforced structural panel of the present invention may be best seen in FIGS. 1 and 2, the method of forming the panel being illustrated with reference also to FIGS. 3 and 4.

Figure 9:
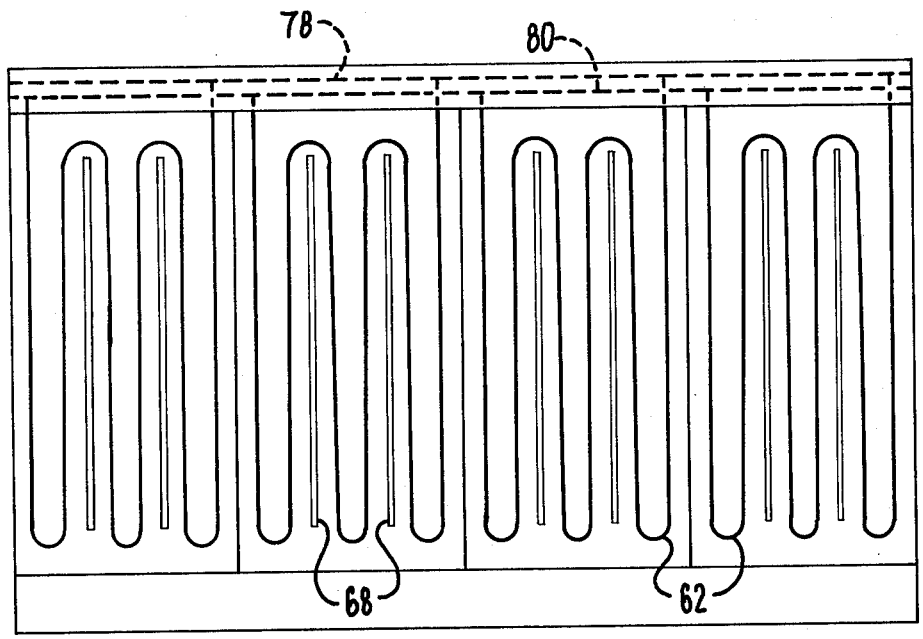
FIG. 9 is a view similar to FIG. 8 while illustrating an alternate arrangement of pipes on each panel with all manifold coupling being arranged along one end of the panels.
Figure 8:
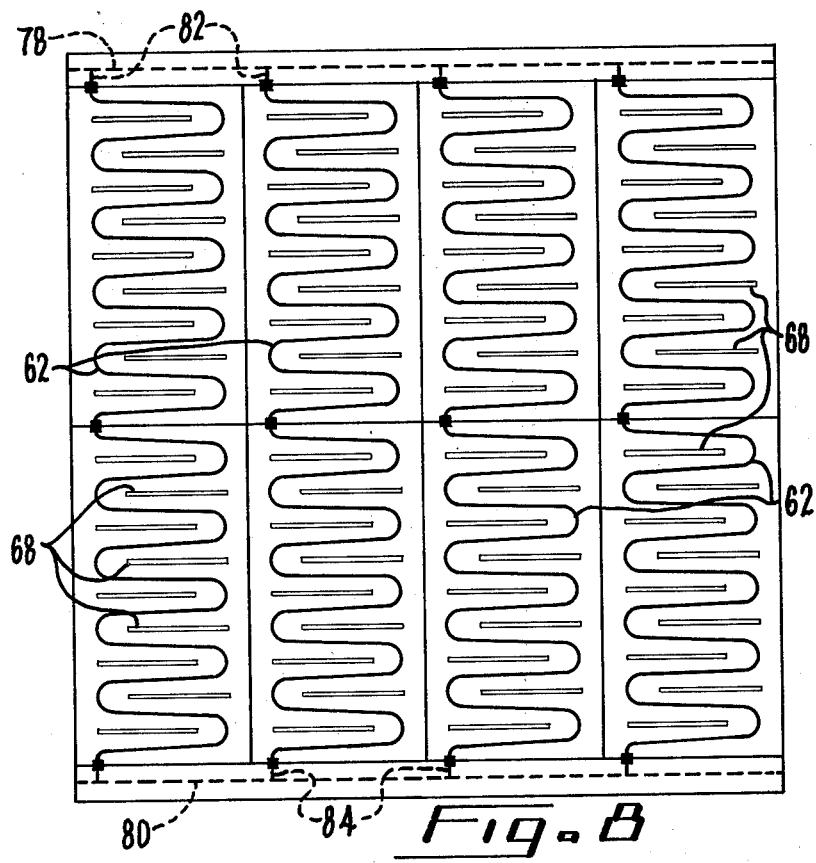
FIG. 8 is a plan view of a plurality of composite reinforced structural panels and solar energy collecting arrays with the collecting means providing a path for circulating a fluid such as water through the pipes of the solar energy collecting arrays.

The composite panel with a solar energy collecting array is best illustrated, at least in connection with the structure of a single composite panel, in FIG. 5. Exemplary configurations of the solar energy collecting array are illustrated in FIGS. 8 and 9.

The manner of joining together a plurality of panels, with or without a solar energy collecting array mounted thereupon, is best illustrated in FIG. 3.

Finally, a manifold arrangement for interconnecting a plurality of solar energy collecting arrays on adjacent panels may be seen in FIG. 5.

FIGS. 6 and 7 together demonstrate the mounting of panels on upright portions of a structure to form a sloping roof. The building surface could be horizontal with little or no slope if used near the equator or if a lesser efficiency of solar energy collection were feasible. The panels might also be mounted in a substantially vertical position to form a sidewall or to conserve space, again at some sacrifice of efficiency.

Within the following description, the structure of the reinforced panel itself is first described along with the method of forming such panels.

The composite assembly of such panels together with an integral solar energy collecting array is thereafter set forth followed by a description of means for interconnecting a plurality of the arrays.

The description proceeds then with the structure and method for assembly for the joints between adjacent panels to form a continuous structural surface. This portion of the description emphasizes that the method and structure for such joints may be applicable to the panels either with or without separate solar energy collecting arrays arranged thereupon.

Referring now to FIG. 1, a reinforced structural panel of the type contemplated by the present invention is generally indicated at 20. The panel 20 includes an upper skin member 22 and a lower skin member 24. Both skin members are formed from materials selected in accordance with the specific applifcation for the panel. For example, to provide a structural panel alone, both of the skin members 22 and 24 could be formed from appropriate grades of plywood. In such an arrangement without a solar energy collecting array, the upper skin member is selected primarily as a weather resistant material. When employed in conjunction with a solar energy collecting array, the upper skin member is also selected to assist in the function of solar energy collection, as will be described in greater detail below.

The lower skin member 24 inherently functions as an internal surface for a structure including a plurality of the panels and may be selected to provide a suitable internal finish surface. However, the lower skin member 24 is more importantly selected for the purpose of cooperating with a flexible, arched member 26 which provides reinforcement for each of the panels 20 and also provides a tension member of the entire panel.

It may be seen from FIGS. 1 and 2 that the flexible arched member 26 has a developed length greater than the corresponding length of the lower skin member 24. With the ends of the flexible arched member 26 and lower skin member 24 being secured together as indicated at 28 and 30, the flexible member 26 is initially caused to assume its arched configuration. Similarly, as with both of the skin members, the arched member 26 may be selected from a variety of materials such as a flexible metal or plastic, for example, provided that the material has sufficient compressive strength along its length when acting as a restrained arch. However, within the present invention, the arched member 26 is preferably formed from plywood, primarily for structural strength and rigidity as well as for purposes of economy and to provide good adhesion with the assembled panel as discussed in greater detail below.

The flexible arched member 26 is maintained in its arched configuration by an adhesive, insulating lightweight material such as an expanded polymer material, preferably a structural grade polyurethane foam for example. The foam, indicated at 32, intimately contacts both sides of the flexible arched member 26 and the adjacent surfaces of the upper and lower skin members 22 and 24. Thus, the foam fills the internal spaces within the panel and serves to stabilize the arched member against colunn-effect buckling and provide dimensional stability for the skin members 22 and 24. Further, the foam system may be selected to reduce or minimize flammability or flame propagation as well as providing insulating quality across the panel.

The particular method of forming and securely holding the arched member in place along its length by means of a material such as polyurethane foam causes the thin arched member to act as a series to short columns while also preventing distortion or buckling of the member.

The dependable adhesive strength of the polyurethane foam is as important as its tensile and compressive strength.

It is also noted at this point that the panels are preferably foamed while in a horizontal position to use the foaming phenomenon of materials such as polyurethanes to best advantage. The configuration and orientation of bubbles in the foam create much greaer usable strength in this manner as the foam becomes part of the basic structural system in each panel. This preferred foaming method is also discussed below.

Within the configuration of the invention, the flexible member 26, which is effectively rigidized in its arched configuration primarily by the foam, serves to resist forces applied to the surface of the upper skin member 22 or possibly suspended from the lower skin. Typical forces of the type referred to above are graphically indicated at 34 in FIG. 1. The arched member 26 further serves to transfer these forces to the end portions of the panel while resisting any deflection of the panel.

Obviously, the effect of the forces 34 on the arched member 26 tends to cause it to flatten out or approach a completely parallel relationship with the bottom skin member 24. To reduce or resist such a tendency, the end portions of the flexible, arched member 26 are firmly secured to the end portions of the lower skin member 24. In this manner, the forces action on the arched member 26 also tend to be disspated as tensile forces with the lower skin member 24. The adjacent end portions of the arched member 26 and lower skin member 24, as indicated at 28 and 30, are secured together by means of elongated, wedge-shaped members indicated at 36 and 38. Preferably, each of the members 36 and 38 is permanently affixed to both the arched member 26 and the lower skin member 24 by means of glue joints reinforced by nails or staples. The joints are indicated respectively at 40 and 42 for each of the members. The end portions of the arched member and lower skin member may be further secured in place relative to each other by end blocks of a type described below (see FIGS. 2, 5, 6 and 7) and secured to the extending end portion 44 and 46 of the lower skin member for abutting engagement with the ends 28 and 30 of the arched member 26.

The functions performed by the foam 32, such as adhering to the arched member 26 and skin members 22, 24 while also providing dimensional strength and stability, low weight, insulating value, etc. are of course conventional for such materials. For example, the foam may be of various polymeric types such as epoxy foam or either polyester or polyether type polyurethane foams. Preferably, the foam is a polyether type material having a typical density of approximately two pounds per cubic foot (2 lb./cu. ft.) or 0.967 grams per cubic centimeter (0.967 gms./cc). The foam is also selected to have a low K factor for maximum insulation and preferably includes a flame retardent component to minimize or eliminate flammability and/or flame propagation.

It has also been found particularly useful to employ a foam system of a "froth" type which is believe to contribute to the desired characteristics of dimensional stability, adhesion and insulating qualilty. Such a foam is available, for example, from Olin-Mathieson Chemical Co. under the tradename AUTOFROTH. All of the foams contemplated for use within the present panel are of course particularly contemplated as being rigid foams in order to provide the desired properties within the panels.

The froth type of foam referred to above may be characterized in that some gas generation or foaming occurs before the initial foam components are actually applied or injected into the panel. Subsequently, after the frothed foam is in contact with the surfaces of the panel, further gas generation or expansion occurs to completely fill the spaces within the panel, the foam intimately adhering to the surfaces of the upper and lower skins and the arched member as the foam cures or sets.

The foam is particularly important between the arched member and lower skin since very substantial tensile stresses develop in this region. Cohesion of the foam and its adhesion to both the arched member and skins is important to maintain structural integrity of the panel.

A preferred method for forming such panels contemplates initial arrangement of the arched member 26 upon the lower skin member 24. The arched member 26 must have its ends 28 and 30 secured to the bottom skin member 24. An exemplary method for securing the arched member 26 to the bottom skin member 24 is illustrated in FIG. 2. The wedge shaped members 36 and 38 are arranged between the adjacent end portions of the arched member 25 and bottom skin member 24, those components being held in place while the reinforced glue joints 40 and 42 are formed. The ends 28 and 30 of the arched member 26 may be held in place by end blocks of the type illustrated at 48 and 50 in FIGS. 1, 2 and 5. The end blocks 48 and 50 are secured to the ends 44 and 46 of the bottom skin member 24, for example, by screws so that they will become an integral portion of the panel construction. The end blocks 48 and 50 may also be removable members designed to completely fill the space between the end portions of the upper and lower skin members 22 and 24 in order to provide restraint or a mold configuration during the injection of foam into the panel. It is particularly important to note that the end blocks 48 and 50 overlap the ends of the arched member 26 in order to hold them firmly in contact with the bottom skin.

Similarly, a restraint or mold configuration is necessary along each elongated edge of the panel. Preferably, the present method of formation for the panel 20 contemplates one such edge block being permanently arranged in place within the panel with another edge block being removable for a purpose described immediately below. Referring momentarily to FIG. 3, it may be seen that two such permanent edge blocks are illustrated at 52 and 54. Further, it may be best seen also in FIG. 3 that each of the edge blocks includes a curved groove or lip portion 56. Referring also to FIG. 2, it may be seen that the curved groove 56 provides an initial support for the arched member 26 to establish its configuration prior to the injection of froth foam into the panel and to secure the member 26 during the foaming process within the panel.

In order to permit the injection of foam into the panel, a removable edge block is illustrated at 58 in FIG. 4. The removable edge block 58 is substantially similar to the permanent edge block 56 except that it is formed from or covered by a material such as polyethylene or other wax-like materials in order to prevent adhesion of the foam thereto. In addition, the removable edge block 58 has a number of openings 60 which are designed to permit the injection of foam into all internal portions of the panel 20.

The permanent edge blocks 52 and 54 in FIG. 3 also serve another important function of providing a means for interconnecting adjacent panels in a structural arrangement. For example, after each panel is formed and the removable edge block 58 is taken from the assembly, it will be apparent that each panel will include a single permanent edge block such as those indicated at 52 and 54 in FIG. 3. The cavity formed along one edge of each panel left by removal of the edge block 58 enables the adjacent panels to be nested together with the upper and lower skins for each panel being secured to the permanent edge blocks 52 and 54.

Such an arrangement could also be employed with the end blocks for example, in installations where end-to-end mounting of the panels is contemplated. However, in many applications, the length of the panels is selected so that each panel spans one full dimension of a structural system. Within such an arrangement, there is of course no need for end-to-end abutment between panels.

As a final note in connection with forming the panels 20, it is particularly preferred to inject the foam material into the panel while the panel is in a horizontal configuration as illustrated in FIGS. 1 and 2. The orientation of the panel during foaming further improves structural strength as well as dimensional stability of the panel and adhesion of the foam to the arched member 26 and the upper and lower skin members 22 and 24. The bubble and grain formation of the foam which develops vertically during foaming is believed to be the basis for the increased strength referred to above.

It is also an important feature of the present invention to provide a composite reinforced structural panel including a solar energy collecting array. Such a composite structural panel facilitates the arrangement of a plurality of the panels to form a structural surface while also providing a complete solar array across the entire surface. The disposition or pattern of the solar array upon each panel may be best seen by reference to FIGS. 3 and 5-9. Within such an arrangement, the upper skin member 22 is preferably formed from a thermally conductive material such as steel, copper or aluminum metal having a blackened heat absorbing upper surface. The solar energy collecting means comprises a tubular member 62, formed for example from steel (or alternatively copper or aluminum) pipe which may be shaped to a form of the type illustrated either in FIG. 8 or 9. The pipe 62 is secured along its length to the blackened upper skin member 22 by soldering or welding or by a thermally conductive filler material indicated at 64. The filler material 64 may be a highly conductive black mastic material for example.

To provide a "greenhouse" effect for the solar energy collecting array, a pane of glass or other transparent material, as indicated at 66, is arranged in spaced apart relation above the pipe 62 and upper skin member 22. Referring momentarily to FIGS. 8 and 9, the glass or plastic 66 is positioned above the upper skin member 22 by means of spacer blocks 68 which may be formed for example from styrofoam which is glued to both the upper skin member 22 and the glass pane 66. The glass or plastic in the panes 66 is selected to preferably allow short wave length heat rays from the sun to pass through with great efficiency and simultaneously resist a reverse flow of lower temperature, longer wave length radiation produced in the panel surfaces.

In order to provide a weatherproof joint between adjacent panes 66, as best illustrated in FIG. 3, an elongated adapted 70 is configured in cross-section to underly both adjacent panes of glass. The overlying edges of the glass panes are covered by gasket material as indicated at 72. For example, the gasket 72 may be formed from one-sixteenth inch or 0.16 cm. rubber stock. A shaped molding is then arranged over the joint between the adjacent panes of glass. The molding, which is indicated in FIG. 3 at 73, may be secured in place, for example by means of self-threading screws 74. Preferably, the self-threading screws 74 penetrate through the adapters 70 into the edge blocks 52 and 54 in order to assist in securing together the various components of the adjacent panels.

In addition, a manifold means is necessary to provide fluid or liquid communication with the conduits or pipes 62 in the solar energy collecting array for each of the panels 20. Such manifold means are illustrated at 76 in each of FIGS. 5-9. As illustrated in those figures, the manifold 76 includes members extending along the length of an assembly of panels. The manifold members 76 include both a supply line 78 and a return line 80 as well as an interconnecting line such as those indicated at 82 and 84 for interconnection with each of the panels 20. Referring to FIG. 8, the arrangement of the interconnecting lines 82 and 84 at opposite ends for each of the pipe arrays 62 may be clearly seen.

In the embodiment of FIG. 8, the solar arrays are selected to permit both the end-to-end and side-to-side stacking of the panels. Two manifold members 76' separately include the supply line 78' and the return line 80'. The return line 80' is preferably arranged along the lowest part of the panels or rod to permit complete draining of the pipes when the solar energy system is not in operation.

FIGS. 6 and 7 also illustrate the manner in which such an arrangement of panels forms the roof of a structure provided with spaced apart supports such as the stud walls indicated respectively at 86 and 88. Referring to those figures, the stud wall 86 is arranged adjacent the peak of the structure and receives one end of the panel to which the manifold member 76 is secured. Note that the manifold member 76 is secured to the panel by a joint arrangement substantially similar to that described above in connection with FIG. 3. Similarly, the other end of each panel 20 is mounted upon the other stud wall 88. To adapt the panel for mounting upon such supports, a wedge shaped element 90 is preferably secured to one end of each panel 20 in a position so that it is in alignment with the wall 86.

Before leaving the description of FIGS. 6 and 7, it is noted that the composite panel and solar array configuration is preferably employed only upon one sloping surface of a structure. In the Northern Hemisphere, of course, the solar array is arranged to face in a generally southern direction to receive maximum sun rays during the entire day. The reinforced structural panel of the present invention might be employed upon both sides of a peaked roof. However, it is conventionally contemplated that the reinforced structural panels would be applied to the northern slope of such a building without the solar energy collecting array.

As noted above, it is contemplated that the panels 20 will have dimensions of four feet by eight, twelve or sixteen feet, for example, which are conventional dimensions for such panels. However, in order to minimize the number of joints in such a surface, the length of the panels is preferably adapted to conform to an entire dimension for the structural surface. In that regard, it may be seen from FIG. 9 that the arrangement of panels shown therein would form one entire sloping surface for a roof of a building. Similarly, the length of panels in FIG. 8 would also be selected to avoid the end-to-end arrangement, if feasible.

It is also possible to arrange the panels of the present invention in both end-to-end as well as side-to-side relationship. In such an arrangement, the spaces between adjacent panels could be sealed in the same manner described above with reference to FIG. 3. For example, the gasket material indicated at 74 could be applied to the upper skin members 22 of the panels with the molding 72 being secured in place thereabove.

It will be obvious that numerous modifications are possible within the scope of the present invention as made apparent from the preceding description. Accordingly, the scope of the present invention is to be determined only from the following appended claims.

What is claimed is:

1. A composite reinforced structural panel and solar energy collecting array suitable for rapid assembly to form the roof of a structure with a solar energy collecting array extending along a surface portion thereof, the structure including spaced-apart supports for receiving end portions of a plurality of the structural panels, each of the panels comprising,
    a reinforced structural panel having a length suitable for spanning the space between the support members of the structure, the reinforced panel comprising an upper skin member and a lower skin member with a flexible member arranged in the form of an arch therebetween and secured at its ends to the lower skin member, adhesive insulating material intimately contacting both sides of the flexible arched member and completely filling the spaces between the flexible arched member and the upper and lower skin members,
    wedge shaped members being arranged between the adjacent end portions of the flexible arched member and lower skin member while being securely connected thereto, end blocks also being secured to the ends of the lower skin member and overlapping the ends of the flexible arched member,
    joint means for securing each of the panels to an adjacent panel,
    a solar energy collecting array being mounted upon the upper skin of the reinforced structural panel, and
    manifold means providing an interconnection for the solar energy collecting array.

2. The composite reinforced structural panel and solar energy collecting array of claim 1 wherein the adhesive insulating material is a polymeric foam.

3. The composite reinforced structural panel and solar energy collecting array of claim 2 wherein the polymeric foam is a structural quality polyurethane foam having high insulating values and including a flame retardant material.

4. A composite reinforced structural panel and solar energy collecting array suitable for rapid assembly to form the roof of a structure with a solar energy collecting array extending along a surface portion thereof, the structure including spaced-apart supports for receiving end portions of a plurality of the structural panels, each of the panels comprising
    a reinforced structural panel having a length suitable for spanning the space between the support members of the structure, the reinforced panel comprising an upper skin member and a lower skin member with a flexible member arranged in the form of an arch therebetween and secured at its ends to the lower skin member, adhesive, insulating foam material intimately contacting both sides of the flexible arched member and completely filling the spaces between the flexible arched member and the upper and lower skin members,
    joint means for securing each of the panels to an adjacent panel, the joint means comprising an edge block associated with each panel, the edges of the upper and lower skin members for adjacent panels being arranged to overlap each of the edge blocks, the overlapping portions of the upper and lower skin members being secured to the edge block in order to secure the panels together, a weatherproofing molding being arranged above the upper skin member to provide weatherproofing for the space between the adjacent panels,
    a solar energy collecting array being mounted upon the upper skin of the reinforced structural panel, and
    manifold means providing an interconnection for the solar energy collecting array.

5. The composite reinforced structural panel and solar energy collecting array of claim 4 wherein the solar energy collecting array comprises a fluid conduit arranged upon the upper skin member of the panel and further comprising manifold means for connecting together the fluid conduits for a plurality of the panels.

6. The composite reinforced structural panel and solar energy collecting array of claim 5 further comprising a pane of light transmitting material arranged in spaced apart relation above the upper skin member and the fluid conduits to provide a greenhouse effect for the solar energy collecting array.

7. A reinforced structural panel suitable for mounting upon a structure having spaced-apart supports for receiving a plurality of the structural panels, each structural panel comprising
    a lower skin member having a length suitable for spanning the distance between the spaced apart supports,
    a flexible member having a length greater than a corresponding length of the lower skin member and being formed into an arch with its ends secured adjacent the ends of the lower skin member,
    wedge-shaped spacers being secured to both the arched member and lower skin member adjacent their intersecting ends, a top skin member spaced apart from all portions of the flexible arched member, an adhesive and insulating structural material being disposed between the flexible arched member and both the upper and lower skin members while being in intimate contact therewith both to maintain the flexible arched member in its arched configuration and to maintain dimensional spacing between the arched member and both the upper and lower skin members, both the upper and lower skin members overlapping the adhesive and insulating structural material along opposing edges of the structural panel, at least one edge block arranged along one edge of each panel between the overlapping portions of the upper and lower skin members, the edge block extending therebeyond to fit between the overlapping upper and lower skin members of an adjacent structural panel, and sealer means for sealing the joints between the upper skins of the adjacent structural panels.

8. The composite reinforced structural panel and solar energy collecting array of claim 7 wherein the adhesive and insulating structural material is a polymeric foam.

9. The composite reinforced structural panel and solar energy collecting array of claim 8 wherein the polymeric foam is a polyurethane foam having high insulating value and including a flame retardant material.

10. The composite reinforced structural panel and solar energy collecting array of claim 7 wherein wedge shaped members are arranged between the adjacent end portions of the flexible arched member and lower skin member while being intimately secured thereto, end blocks also being secured to the ends of the lower skin member and overlapping the ends of the flexible arched member.

11. The composite reinforced structural panel and solar energy collecting array of claim 7 wherein the joint means comprises an edge block associated with each panel, the edges of the upper and lower skin members for adjacent panels being arranged to overlap each of the edge blocks, the overlapping portions of the upper and lower skin members being secured to the edge block in order to secure the panels together, a weatherproofing molding being arranged above the upper skin member to provide weatherproofing for the space between the adjacent panels.

12. A structural panel suitable for rapid assembly to form a portion of a structure including spaced-apart supports for receiving end portions of a plurality of the structural panels, each of the panels having a length suitable for spanning the space between the support members of the structure, the reinforced panel comprising an upper skin member and a lower skin member with a flexible member arranged in the form of an arch therebetween, means securing the ends of the flexible member to the lower skin member, wedged shaped members being arranged between the adjacent end portions of the flexible arched member and lower skin member while being intimately secured thereto, end blocks also being secured to the ends of the lower skin member and securing the ends of the flexible arched member to assist in maintaining the flexible member in its arched configuration, structural grade polymeric foam intimately contacting and adhering to both sides of the flexible arched member and completely filling the spaces between the flexible arched member and the upper and lower skin members.

13. A structural panel suitable for rapid assembly to form a portion of a structure including spaced-apart supports for receiving end portions of a plurality of the structural panels, each of the panels having a length suitable for spanning the space between the support members of the structure, the reinforced panel comprising an upper skin member and a lower skin member with a flexible member arranged in the form of an arch therebetween, means securing the ends of the flexible member to the lower skin member, structural grade polymeric foam intimately contacting and adhering to both sides of the flexible arched member and completely filling the spaces between the flexible arched member and the upper and lower skin members, each panel including joint means comprising an edge block associated with each panel, the edges of the upper and lower skin members for adjacent panels being arranged to overlap each of the edge blocks, the overlapping portions of the upper and lower skin members being secured to the edge block in order to secure the panels together, a weatherproofing molding being arranged above the upper skin member to provide weatherproofing for the space between the adjacent panels.

14. The structural panel of claim 12 wherein the polymeric foam is a polyurethane foam having high insulating and flame retarding qualities.

15. A composite reinforced structural panel suitable for rapid assembly to form the roof of a structure including spaced-apart supports for receiving end portions of a plurality of the structural panels, each of the panels comprising a reinforced structural panel having a length suitable for spanning the space between the support members of the structure, the reinforced panel comprising an upper skin member and a lower skin member with a flexible member arranged in the form of an arch therebetween and secured at its ends to the lower skin member, adhesive polymeric foam insulating material intimately contacting both sides of the flexible arched member and completely filling the spaces between the flexible arched member and the upper and lower skin members, wedge shaped members being arranged between the adjacent end portions of the flexible arched member and lower skin member while being securely connected thereto, end blocks also being secured to the ends of the lower skin member and overlapping the ends of the flexible arched member, and joint means for securing each of the panels to an adjacent panel.

16. A composite reinforced structural panel suitable for rapid assembly to form the roof of a structure including spaced-apart supports for receiving end portions of a plurality of the structural panels, each of the panels comprising a reinforced structural panel having a length suitable for spanning the space between the support members of the structure, the reinforced panel comprising an upper skin member and a lower skin member with a flexible member arranged in the form of an arch therebetween and secured at its ends to the lower skin member, adhesive polymeric foam insulating material intimately contacting both sides of the flexible arched member and completely filling the spaces between the flexible arched member and the upper and lower skin members, joint means for securing each of the panels to an adjacent panel, the joint means comprising an edge block associated with each panel, the edges of the upper and lower skin members for adjacent panels being arranged to overlap each of the edge blocks, the overlapping portions of the upper and lower skin members being secured to the edge block in order to secure the panels together, a weatherproofing molding being arranged above the upper skin member to provide weatherproofing for the space between the adjacent panels.

17. A structural panel suitable for rapid assembly to form a portion of a structure including spaced-apart supports for receiving end portions of a plurality of the structural panels, each of the panels having a length suitable for spanning the space between the support members of the structure, the reinforced panel comprising an upper skin member and a lower skin member with a relatively longer flexible member arranged in the form of an arch therebetween, means securing the ends of the flexible member to the lower skin member so that the flexible member is caused to assume an arched form, the upper and lower skin members being spaced-apart from all portions of the flexible member between its ends which are secured to the lower skin member, adhesive and insulating polymeric foam intimately contacting and adhering to both sides of the flexible arched member along its entire length between the ends secured to the lower skin member and completely filling the spaces between the flexible arched member and the upper and lower skin members in order to cause the flexible arched member to act as a series of short columns while also preventing distortion or buckling of the arched members.

* * * * *